United States Patent
Noma et al.

(10) Patent No.: US 7,295,600 B2
(45) Date of Patent: Nov. 13, 2007

(54) ADSL MODEM APPARATUS AND RE-INITIALIZATION METHOD FOR ADSL MODEM APPARATUS

(75) Inventors: Nobuhiko Noma, Yokohama (JP); Tatsuo Imai, Chigasaki (JP); Keiichi Tomita, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 850 days.

(21) Appl. No.: 10/184,942

(22) Filed: Jul. 1, 2002

(65) Prior Publication Data

US 2003/0063600 A1    Apr. 3, 2003

(30) Foreign Application Priority Data

Oct. 1, 2001    (JP)    ............................. 2001-305569

(51) Int. Cl.
    *H04B 1/38*    (2006.01)
(52) U.S. Cl. .................................................... 375/222
(58) Field of Classification Search ................ 375/222, 375/225, 340, 219, 220, 259, 257; 370/249, 370/252, 378, 282, 430
    See application file for complete search history.

(56) References Cited

U.S. PATENT DOCUMENTS

| | | | |
|---|---|---|---|
| 6,498,808 B1 * | 12/2002 | Tzannes | 375/225 |
| 6,549,572 B1 * | 4/2003 | Anderson et al. | 375/225 |
| 6,768,772 B2 * | 7/2004 | Palm | 375/222 |
| 2002/0034196 A1 * | 3/2002 | Tzannes | 370/529 |
| 2003/0048835 A1 | 3/2003 | Noma et al. | |

FOREIGN PATENT DOCUMENTS

| | | |
|---|---|---|
| JP | 2000-307751 | 11/2000 |
| JP | 2003-087350 | 3/2003 |

OTHER PUBLICATIONS

English Language Abstract of JP 2000-307751.
English Language Abstract of JP 2003-087350.

* cited by examiner

*Primary Examiner*—Chieh M. Fan
*Assistant Examiner*—Jaison Joseph
(74) *Attorney, Agent, or Firm*—Greenblum & Bernstein, P.L.C.

(57) ABSTRACT

The present invention monitors communication status during a data communication, determines whether the current communication status needs a re-initialization, requests a re-initialization of an opposing ADSL modem apparatus by transmitting ClearEOC when a re-initialization is needed, receives a response to a re-initialization request from the opposing ADSL modem apparatus, and performs a re-initialization after a predetermined time period.

6 Claims, 8 Drawing Sheets

ADSL MODEM APPARATUS AND RE-INITIALIZATION METHOD FOR ADSL MODEM APPARATUS

BACKGROUND OF THE INVENTION

1. Field of the Invention

The present invention relates to an ADSL modem apparatus and a re-initialization method of an ADSL modem apparatus that initiates a data communication after setting an optimal parameter according to a line condition through an initialization procedure.

2. Description of Related Art

With the widespread use of the Internet, there is an increasing demand for a high-speed access line that can be used for a fixed connection. Optical fiber is becoming more popular in the backbone of communication industries, and gigabit class super high-speed lines are starting to be employed in the key components of the backbone. However, most of the subscriber lines that connect user's home and storage centers of the communication industries are copper wire cables that are constructed for telephones. Therefore, an introduction of the xDSL technology that enables a high-speed communication of several M bits/second with a copper wire cable has been considered.

An ADSL method is one aspect of the xDSL technology. The ADSL method uses a much higher carrier frequency range of more than 35 kHz compared to the range used for telephones (less than 4 kHz). Therefore, a high-speed data communication can be performed using a telephone line, without hindering telephone functions.

FIG. 6 is a schematic illustration of a system configuration of a subscriber side. The storage center of a communication industry (center side) transmits signals to line 1. User's home (remote side) splits received signals from line 1 at splitter 2, inputting voice range signals (less than 4 kHz) into a telephone (POTS: Plain Old Telephone Service) 3, and high range signals (more than 35 kHz) into ADSL communication apparatus 4. ADSL communication apparatus 4 includes ADSL modem 5 and controller 6. Controller 6 controls data transmission/reception with data communication apparatus 7 (e.g., personal computer) and performs an initialization control for ADSL modem 5.

FIGS. 7 and 8 illustrate initialization sequence that is performed at ADSL modem 5 based on the ITU-T recommended G.992.1. In the example of FIG. 7, the control is arranged to perform a handshake procedure based on the ITU-T recommended G.994.1, prior to performing an initialization sequence.

In an initialization sequence based on the ITU-T recommended G. 992.1, the center side transmits C-RATES1 and C-MSG1 to the remote side, while the remote side transmits R-RATES1 and R-MSG1 to the center side. The center side informs the remote side regarding a general transmission speed for the downlink and uplink and additive information. In response, the remote side informs the center side regarding the remote side's transmission speed and additive information.

Then, both center and remote sides transmit training signals, C-MEDLEY and R-MEDLEY respectively, so that both center and remote sides check the reception conditions and determine carriers for carrier-off and bit number used for each carrier.

Further, the remote side transmits R-RATES-RA and R-MSG-RA, while the center side transmits C-RATES-RA and C-MSG-RA, so that the remote side can notify the center side of the capacity information of the remote side and information corresponding to a reception status (e.g., S/N), and the center side can notify the remote side of detailed information based on the reception result of R-MEDLEY (e.g., uplink and downlink transmission speed) and capacity information.

Then, the remote side transmits R-RATES2 and R-MSG2 to the center side, while the center side transmits C-RATES2 and C-MSG2 to the remote side, so that the remote side can inform the center side regarding the information such as capacity and uplink/downlink transmission speed determined by the remote side, and the center side can declare that the communication will be performed using capacity information, uplink/downlink transmission speed, and additive information determined by the center side.

Lastly, the center side transmits the declared capacity information, uplink/downlink transmission speed, and additive information as C-B&G to the remote side. The remote side transmits the capacity information, uplink/downlink transmission speed, and additive information instructed by the center side as R-B&G to the center side.

Then, B&G setting a carrier number for carrier off, bit allocation for each carrier to be used, gain information for the carriers to be used is finally exchanged, to complete the initialization sequence. Upon normally completing the initialization sequence, the data communication begins (SHOWTIME).

After a transition is made to the data communication, both center and remote sides monitor communication errors caused by factors such as a communication line abnormality. If the center side or the remote side detects a communication error, the above-described initialization sequence is performed again (performing an initialization sequence hereafter will again be referred to as "re-initialization process"), and restarts the data communication by setting an optimal parameter for the line condition.

However, in conventional ADSL modems, when the center side or the remote side detects a communication error, both sides recognize the need for a re-initialization process with the detecting side discontinuing the data communication and the other side detecting the discontinued data communication. When both sides recognize the need for a re-initialization, the re-initialization process is performed. Accordingly, data communication is always need to be terminated for a re-initialization process, thus making it impossible to provide an effective re-initialization process.

SUMMARY OF THE INVENTION

This invention addresses the above-described problem. The object of the present invention is to provide an ADSL modem apparatus and a re-initialization method for an ADSL modem that can effectively perform a re-initialization process without terminating a data communication.

An ADSL modem according to the present invention monitors communication status during a data communication, determines whether the current communication status needs a re-initialization, requesting a re-initialization of the opposing ADSL modem apparatus by transmitting Clear-EOC when a re-initialization is necessary, and performs a re-initialization after a predetermined time period once a response to the re-initialization request is received from the opposing ADSL modem apparatus.

By employing the present invention, it is possible to perform a re-initialization process during a data communication. Therefore, it is possible to eliminate the need for always discontinuing the data communication, and to effectively perform a re-initialization process.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

Figure 6:
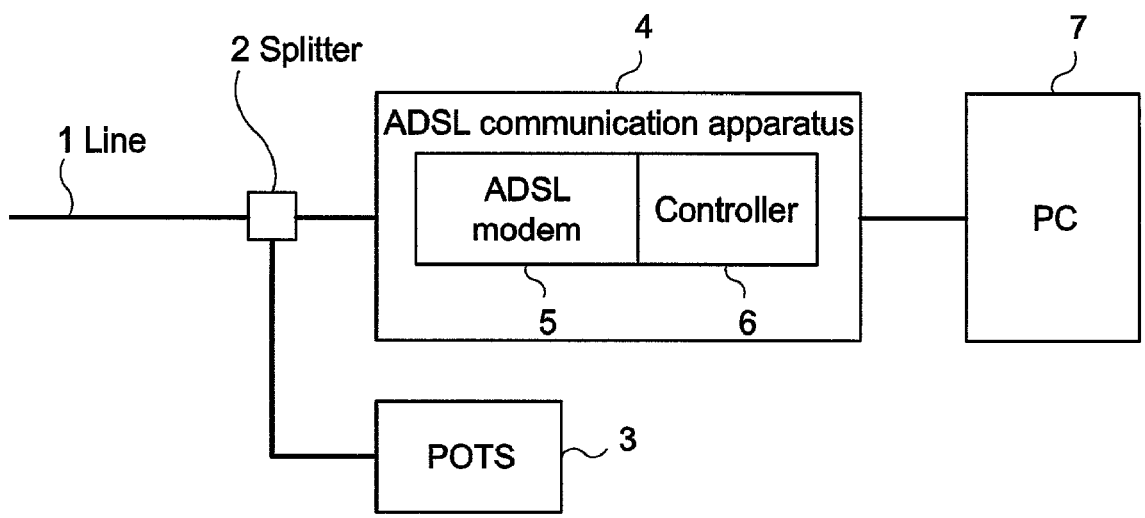
FIG. 6 illustrates a schematic system configuration of the remote side.

The embodiment of the present invention is explained in the following, in reference to the above-described drawings. An ADSL modem apparatus (hereafter referred to as "ADSL modem") according to the embodiment of the present invention is employed as communication apparatuses (ADSL communication apparatuses) of a subscriber side (remote side) having a schematic system configuration of FIG. 6 and of a storage center side (center side) for a communication industry.

Figure 1:
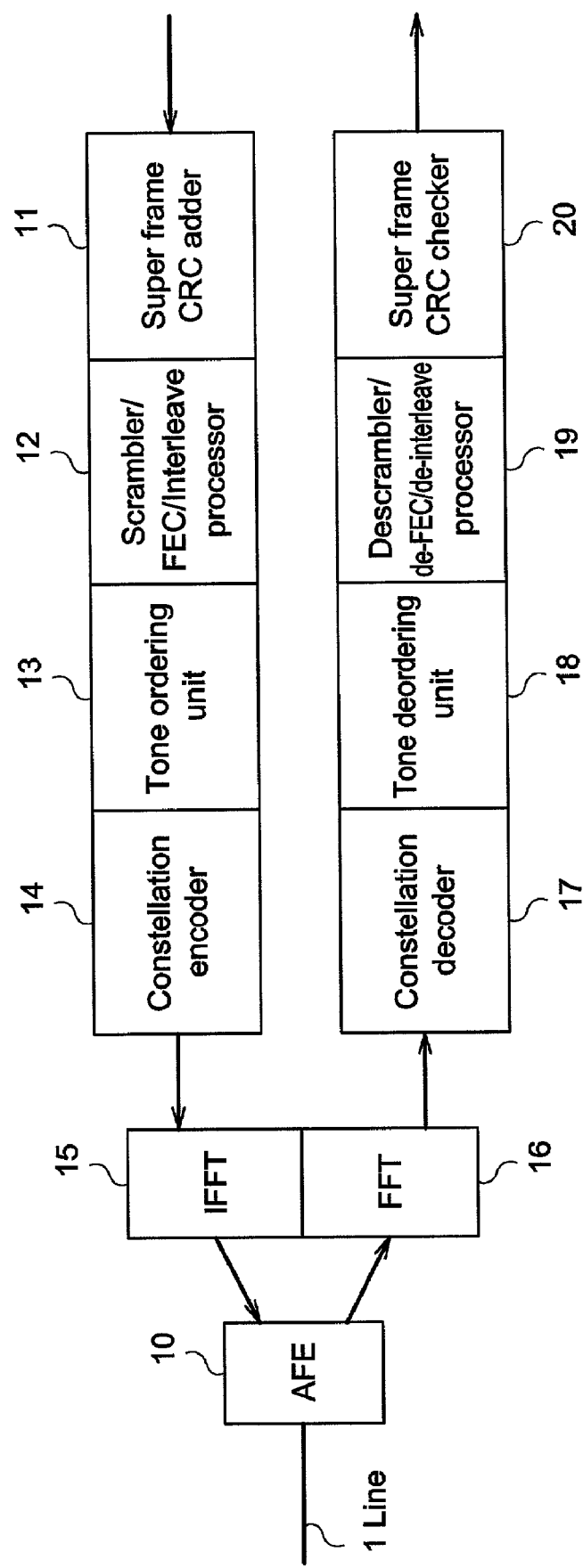
FIG. 1 is a block diagram illustrating an ADSL modem configuration according to an embodiment of the present invention.

FIG. 1 illustrates a configuration of a modem section of the ADSL communication apparatus (ADSL modem) of the center and remote sides. The ADSL modem is connected to line 1 via analog front end (AFE) 10. Analog front end (AFE) 10 has a DA conversion function that converts digital signals transmitted to an uplink into analog signals, and AD conversion function that converts analog signals input from a downlink into digital signals. The sender side has super frame CRC adder 11 that adds a check bit in front of a super frame, scrambler/FEC/interleave 12 that performs a scramble process spreading the transmission frequencies, forward/error/correction process adding symbols for correcting errors, and interleave process, tone ordering unit 13 that performs tone ordering process controlling the carrier ordering for bit allocation, constellation encoder 14 that converts symbols into topology information on an I-Q plane with a predetermined bit unit, and inverse fast Fourier transformer (IFFT) 15.

The receiver side has fast Fourier transformer (FFT) 16 that performs a fast Fourier conversion on the reception signals output from analog front end 10, constellation decoder 17 that converts the topology information on the I-Q plane output for every carrier from fast Fourier transformer 16 into bit information, tone de-ordering unit 18 that rearranges the signals in the original positions after the tone ordering process at the sender side, de-scrambler/de-FEC/de-interleave unit 19 that rearranges the scramble process, forward/error/correction process, and interleave process performed at the sender side, and super frame CRC check unit 20 that checks the reliability of the data after examining the check bit added in front of the super frame.

Figure 7:
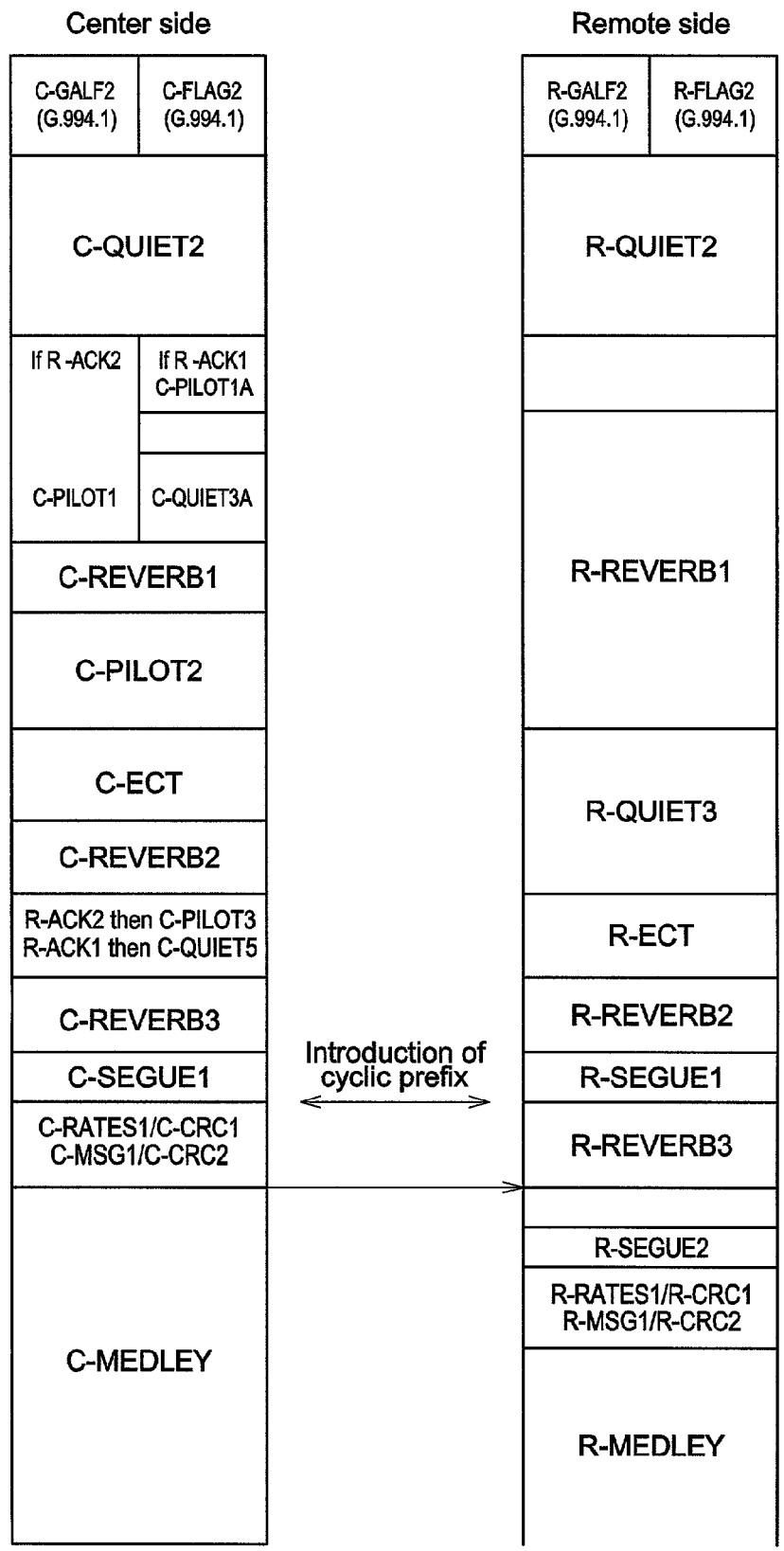
FIG. 7 is a first half of an initialization sequence based on ITU-T recommended G.992.1.
Figure 8:
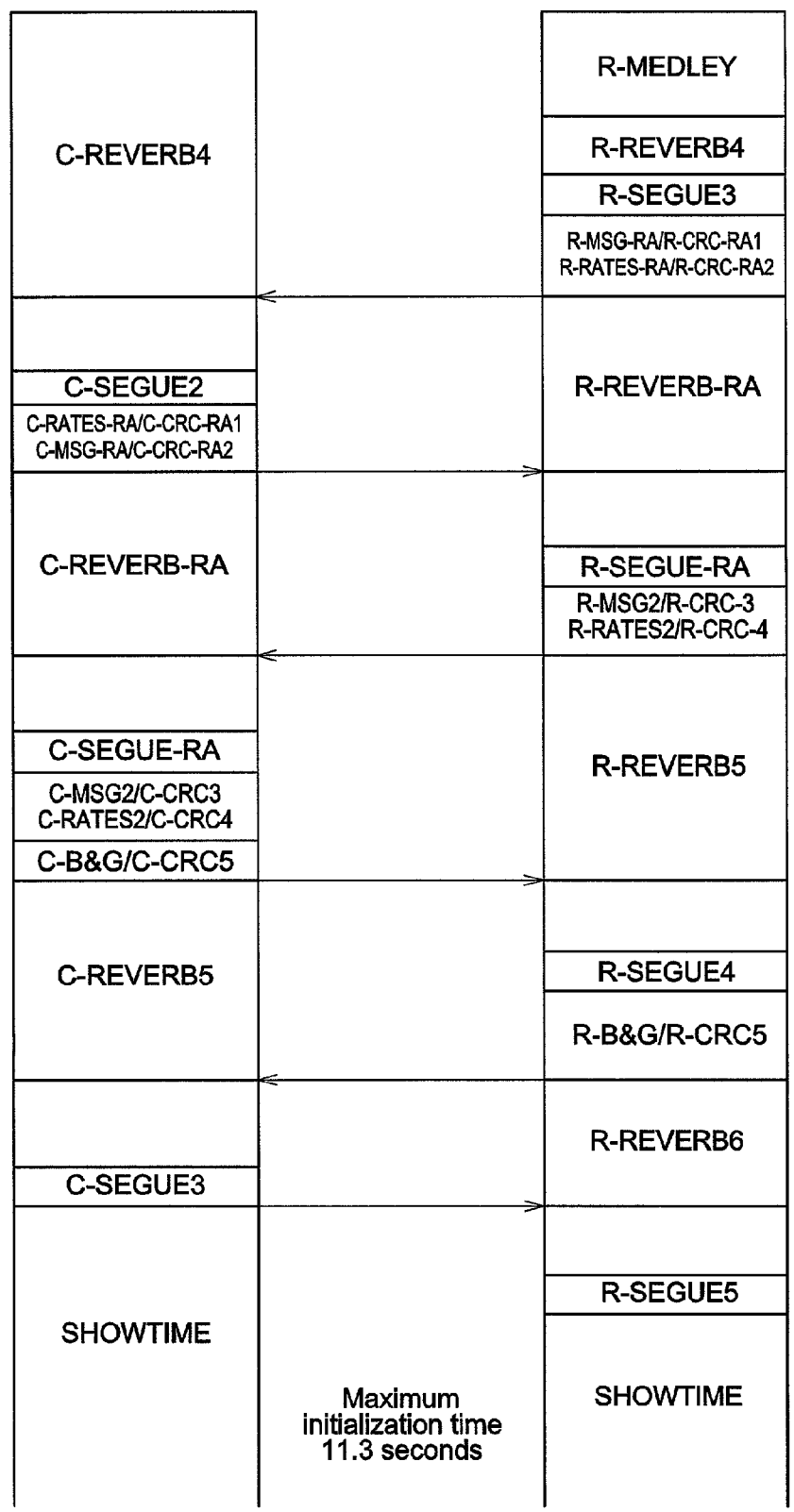
FIG. 8 is a second half of the initialization sequence based on ITU-T recommended G.992.1.

The above-described functions of both sender and receiver sides, which are controlled by a controller of the ADSL communication apparatus, perform the sequence illustrated in FIGS. 7 and 8. The ADSL modem according to the embodiment of the present invention performs a re-initialization process after a data communication is initiated, according to the original procedure preset between the center and remote sides. FIGS. 7 and 8 illustrates a flow in which the ADSL modem performs a re-initialization process after a data communication is initiated.

When an ADSL communication apparatus at the remote side is turned on, the ADSL modem at the remote side sends a connection request to the ADSL modem at the center side, so that the line between the remote and center sides is connected. In this embodiment, the ADSL modem at the center side is always ready to response to the remote side's connection request.

When the line is established between the remote and center sides, a handshake procedure is performed as shown in FIG. 7. FIG. 7 illustrates a handshake procedure based on the ITU-T recommended G.994.1. In the present embodiment, the handshake procedure checks whether the opposing apparatus is capable of performing an original procedure. If the opposing apparatus is capable of performing the original procedure, an re-initialization process is performed according to the original procedure after initiating a data communication.

Figure 2:
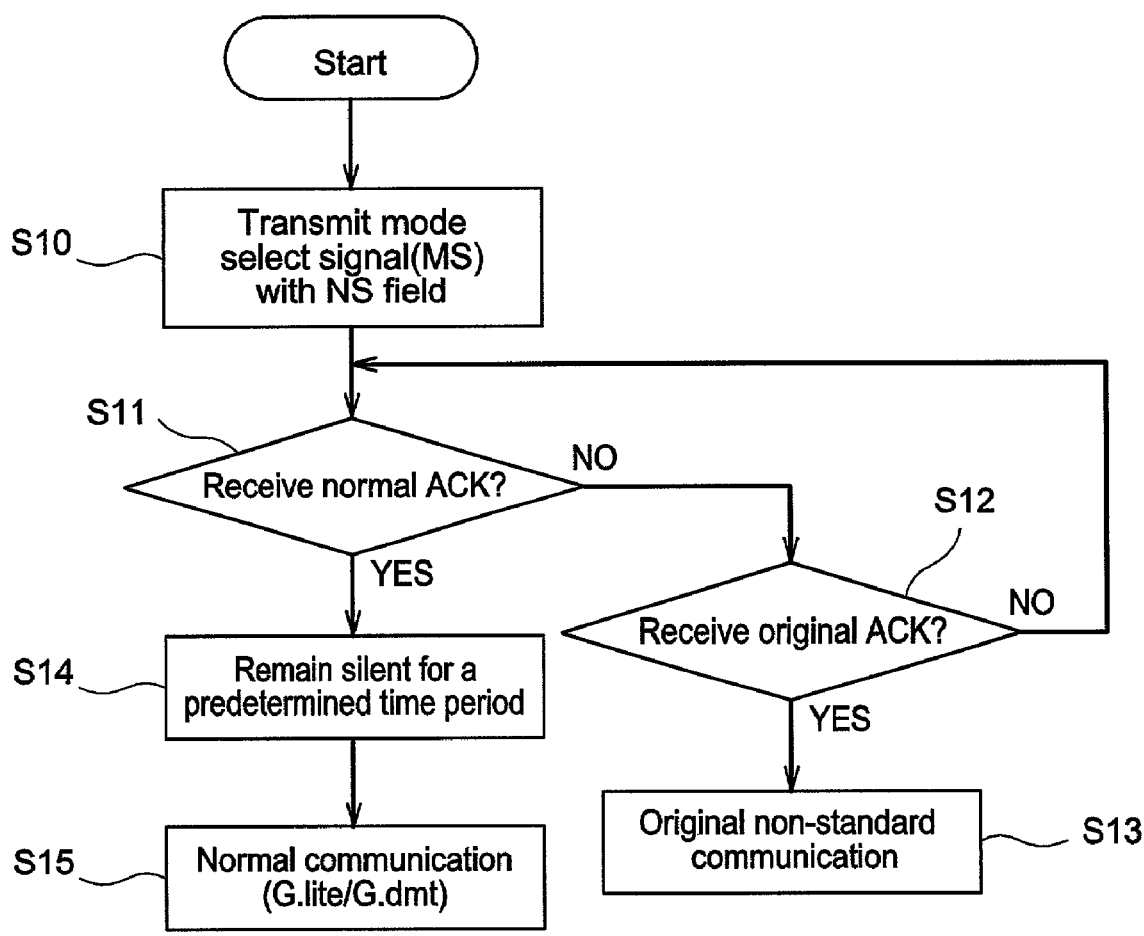
FIG. 2 is a flowchart illustrating a handshake procedure that is performed by a remote side according to the embodiment of the invention.

FIG. 2 is a flowchart for the remote side to determine whether the original procedure is possible during the handshake procedure. The remote side transmits a mode select signal (MS) with NS (Non-Standard Information) field to the center side (Step 10).

Figure 3:
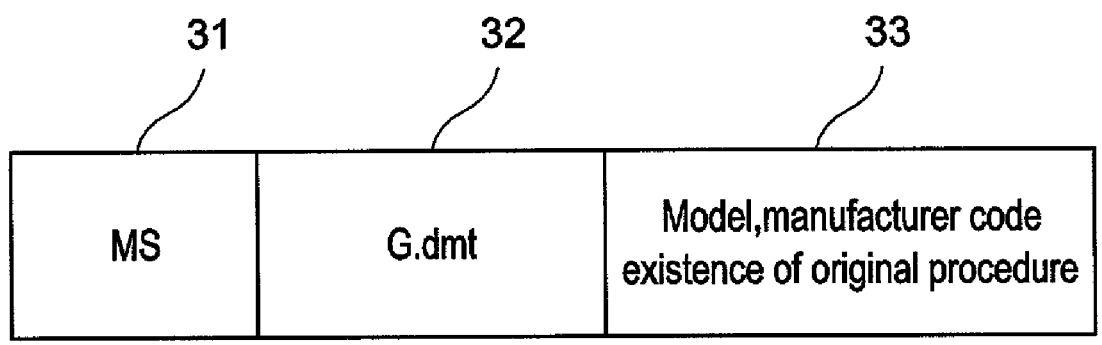
FIG. 3 illustrates a field configuration of a mode select signal that is employed according to the embodiment of the invention.

FIG. 3 illustrates a field configuration of the mode select signal (MS). As shown in figure, the mode select signal (MS) is provided with identification field 31, standard information field 32, and non-standard information field 33.

In identification field 31, a command regulating the overall features of the handshake procedure is set. The example in FIG. 3 shows that the command "MS" is set stating that it is a mode select signal.

In standard information field 32, standard information such as the initialization sequence and communication method used for the data communication is set. For example, when identification information field 31 sets "MS", standard information field 32 sets "G.dmt". When non-standard information 33 is not included, the initialization sequence and data communication is arranged to perform based on the ITU-T recommended G.dmt.

Non-standard information field 33 is a field that a manufacturer can set their original information. In this embodiment, manufacturer code, modem model, information whether the original procedure is available, and contents of the original procedure are set to inform that the remote side is capable of performing the original procedure.

The invention is not limited to the above information as long as the information set in non-standard information field 33 is capable of informing the opposing side that the apparatus can perform the later-described original procedure for a re-initialization process after initiating a data communication.

There are situations in which the center side model can or cannot analyze and recognize non-standard information field 33 of the mode select signal transmitted by the remote side. In this embodiment, if the center side model is capable of analyzing non-standard information field 33 and recognizing the information, it is considered that the later-described original procedure can be performed.

When the center side model is capable of analyzing non-standard information field 33 and recognizing the information, the center side transmits an original ACK to the remote side to inform that the original procedure can be performed. If non-standard information field 33 cannot be recognized, a normal ACK (ACK according to the ITU-T recommendation) corresponding to identification field 31 and standard information field 32 is transmitted to the remote side.

The remote side analyzes the ACK received from the center side and checks whether it is a normal ACK (Step 11). If it is not a normal ACK, the remote side checks whether it is an original ACK (Step 12). If it is an original ACK sent from the center side, the later-described original non-standard communication procedure, i.e., the re-initialization process according to the original procedure, is performed (Step 13).

When it is a normal ACK sent from the center side, the remote side remains silent only for a predetermined time period without performing the original procedure (Step 14), and performs the initialization sequence according to the ITU-T recommendation as shown in FIGS. 7 and 8, for example (Step 15). Accordingly, the re-initialization process is performed according to the normal procedure.

Accordingly, during the handshake procedure performed prior to the initialization sequence, whether the opposing model is capable of performing the original procedure is checked. Therefore, it is possible to make a transition to the standard initialization sequence when the opposing model cannot perform the original procedure, thereby preventing to perform unnecessary procedures.

The ADSL modem according to the embodiment of the present invention determines the need for a re-initialization process while monitoring status such as eye patterns detected from reception data from an opposing side after a data communication is initiated, performs a re-initialization process when it is needed, and re-initiates the data communication by setting an optimal parameter according to the line condition. Especially, the invention is characterized by having both center and remote sides recognizing a need for the re-initialization.

To be specific, the ADSL modem according to the embodiment of the present invention sets a pre-arranged predetermined data in ClearEOC that is communicated between the center and remote sides after a normal data communication is initiated (after making a transition to SHOWTIME), in order for both center and remote sides to recognize the need for a re-initialization.

Figure 4:
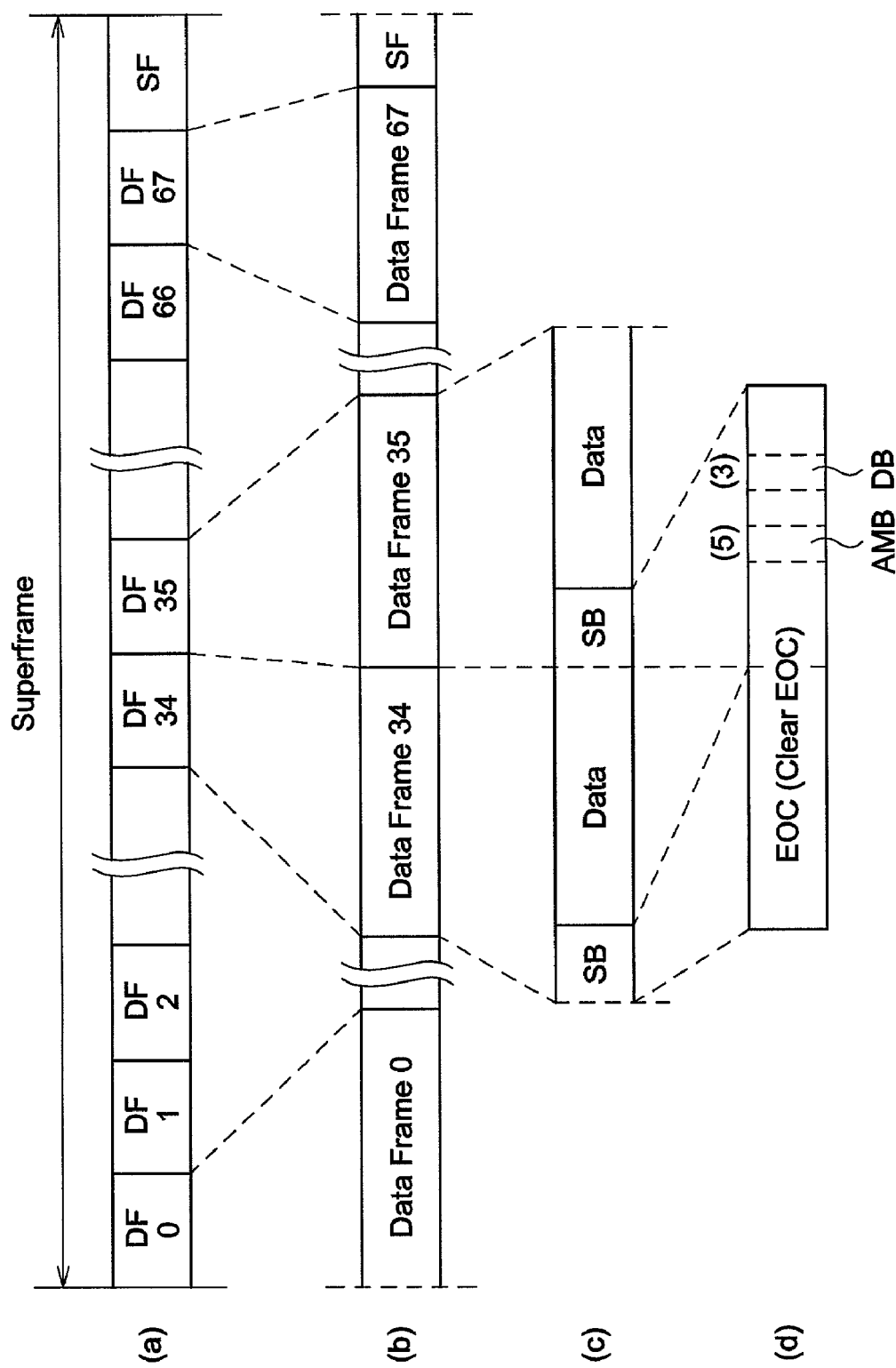
FIG. 4 illustrates a configuration of data communicated by the ADSL modem according to the embodiment of the invention.

Hereafter, the characteristics of ClearEOC communicated between the center and remote sides during a data communication (SHOWTIME) are illustrated using FIG. 4. FIG. 4 illustrates a configuration of data communicated using G.dmt and G.lite.

As shown in FIG. 4(a) and (b), a data communication is performed by exchanging 68 DFs (Data Frames) starting from 0 to 67 and super frame configured with a SF (Synchronous Frame), in order to have a synchronization in G.dmt and G.lite. Each DF is called a symbol.

As shown in FIG. 4(c), each symbol includes a SB (Synchronous Byte) that is used as a part of CRC, EOC command, or AOC command. In the present embodiment, it is assumed that SB is used as an EOC command.

An EOC command is configured with a plurality of connected SB symbol. In this embodiment, as shown in FIG. 4(d), an EOC command is configured with 13 bytes that are taken among connected 16 byte SB, SB being configured with 2 continuing SB symbols. For example, a command instructing an opposing side of a READ/WRITE process is written in an EOC command.

If the third bit (data bit) is "0", and the fifth bit (Autonomous Message Bit) is "0" within an EOC command, the EOC command is treated as ClearEOC. The usage method of ClearEOC is not regulated under a recommendation; therefore, usage method setting is made by individual upper layer.

As described above, the present embodiment sets a pre-arranged predetermined data in ClearEOC, so that both center and remote sides recognize the need for a re-initialization.

In particular, "00000000" is set from $6^{th}$ to $13^{th}$ bits configuring a information field within ClearEOC during a normal communication, while "11111111" is set during requesting (responding to) a re-initialization.

In other words, if "11111111" is set in an information field in ClearEOC received from an opposing apparatus, it is recognized that a re-initialization is necessary. Similarly, as a response, a ClearEOC setting "11111111" in the information field is returned. Accordingly, both center and remote sides recognize the need for a re-initialization process.

Figure 5:
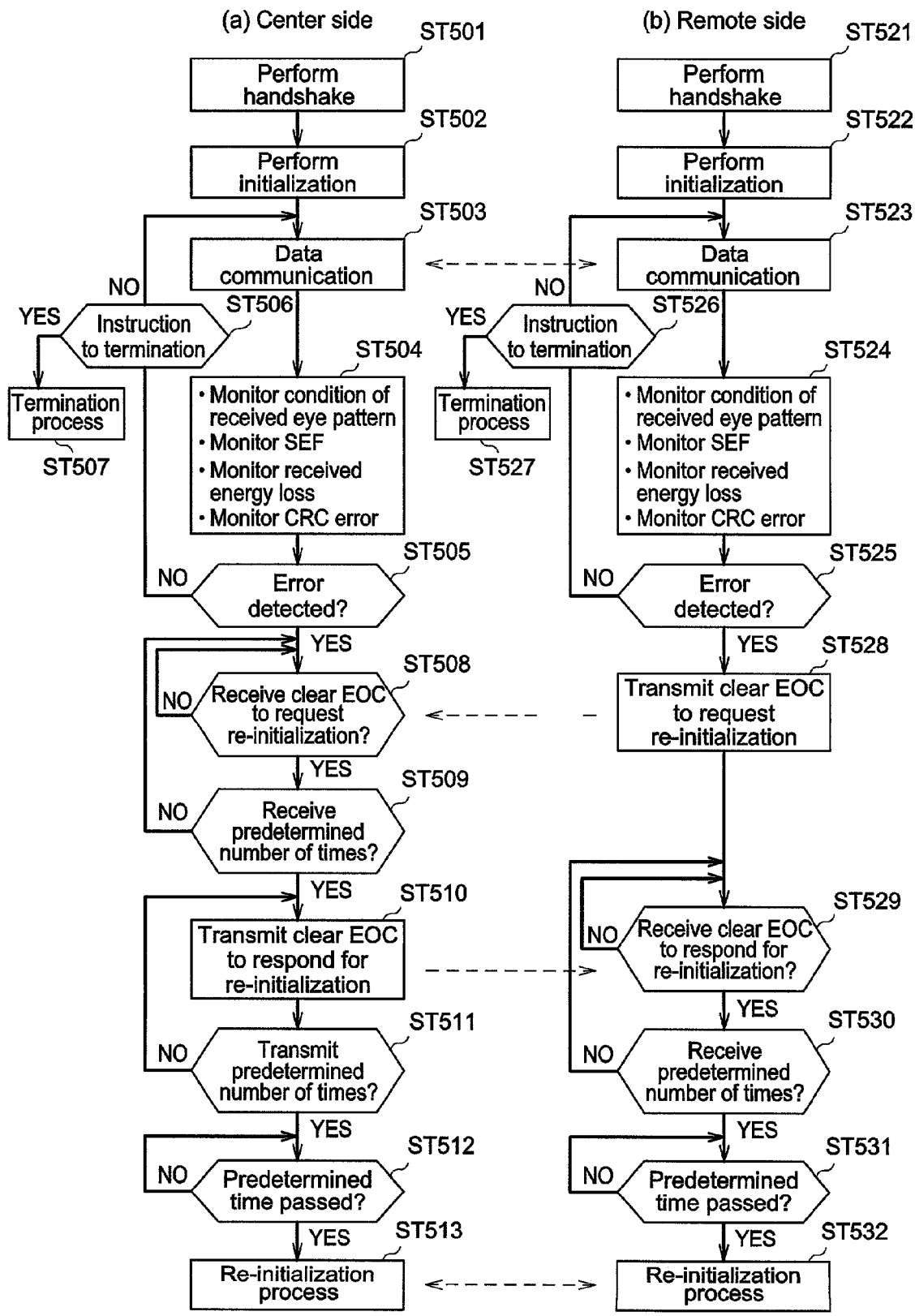
FIG. 5 is a flowchart illustrating an operation of the ADSL modem according to the embodiment of the invention.

Hereafter, by referring to an initialization sequence shown in FIGS. 7 and 8, FIG. 5 is used to illustrated an operation of the ADSL modem according to the embodiment of the present invention. FIG. 5 is a flowchart illustrating the operation of ADSL modem according to the embodiment of the present invention. FIG. 5(a) illustrates an operational flow of the center side, and FIG. 5(b) illustrates an operational flow of the remote side.

As illustrated in FIG. 7, both center and remote sides first perform a handshake procedure (ST501 and ST521). During the handshake procedure, it is determined whether an opposing apparatus is capable of performing an original procedure as illustrated in FIGS. 2 and 3.

When the handshake procedure is completed, the initialization sequence is performed as illustrated in FIGS. 7 and 8 (ST502 and ST522), and setting such as transmission speed for the data communication, additive information including carrier numbers for carrier-off, and bit allocation for each carrier to be used is provided.

After the initialization sequence is completed, the data communication is initiated (ST503 and ST523). Upon initiating the data communication, eye patterns detected from reception data, SEF, energy loss and CRC errors of reception data from both sides are monitored (ST504 and ST524).

In particular, an error is detected when a diameter of an eye pattern radius is greater than a predetermined value. While monitoring SEF, it is determined whether SF (Synchronous Frame) is correctly received with a normal eye pattern. Also, it is determined whether reception data is received with an energy that is greater than a predetermined value. In addition, it is determined whether a CRC bit added in front of a super frame (a unit for data communication) indicates an error.

The need for a re-initialization is determined according to the monitoring result detected from such reception data (e.g., eye pattern) (ST505 and ST525). Particularly, when an eye pattern distribution radius is greater than a predetermined value, when SF is not received correctly, when reception data has smaller energy than a predetermined value, or when a CRC bit indicates an error, it is determined that a re-initialization is necessary, and the re-initialization process is started.

The determination of the need for the re-initialization is made when the status for the current communication is overly optimal, as well as when the current communication is difficult to be maintained. In particular, when the current communication status is overly optimal, it is assumed that the communication status has been improved since initiating the data communication. Therefore, a re-initialization process is performed in such a case, so that the data communication is provided with the most suitable parameter for the line condition.

If the re-initialization process is not necessary, it is checked whether a instruction is given to terminate the data communication (ST506 and ST526). When there is no such instruction given, the control returns the process to ST503 and ST523 to continue the data communication. When there is an instruction to terminate the data communication, the control moves to a termination process (ST507 and ST527).

When both center and remote sides determine that the re-initialization is necessary, the remote side transmits ClearEOC having a predetermined data in an information field as described above (hereafter referred to as ClearEOC for requesting a re-initialization) (ST528). In order to prevent erroneous recognition at the center side, the remote side transmits ClearEOC for requesting a re-initialization multiple times. Accordingly, the re-initialization process is requested of the center side.

The center side, on the other hand, monitors whether ClearEOC for requesting a re-initialization from the remote side is received (ST508). When it is confirmed that ClearEOC for requesting a re-initialization is received, whether the same ClearEOC is received predetermined number of times is checked (ST509).

When a ClearEOC for requesting a re-initialization is not received at ST508, or when ClearEOC for requesting a re-initialization is not received predetermined number of times at ST509, the center side continues to monitor the reception of ClearEOC for requesting a re-initialization.

When ClearEOC for requesting a re-initialization is received predetermined number of times, the center side transmits ClearEOC having a predetermined data in an information field (hereafter referred to as "ClearEOC for responding to a re-initialization request") (ST510). Then, whether the same ClearEOC for responding to a re-initialization request is transmitted predetermined number of times is checked (ST511). If not, the process of ST510 is repeated until ClearEOC is received predetermined number of times.

Upon transmitting ClearEOC for requesting a re-initialization at ST528, the remote side monitors the reception of ClearEOC for responding to a re-initialization request from the center side (ST529).

Upon confirming the reception of ClearEOC for responding to a re-initialization request from the center side, the remote side checks whether ClearEOC for responding to a re-initialization request is received predetermined number of times (ST530).

When ClearEOC for responding to a re-initialization request is not received at ST529, or when ClearEOC for responding to a re-initialization request is not received predetermined number of times at ST530, the remote side continues to monitor the reception of ClearEOC for responding to a re-initialization request.

When ClearEOC for responding to a re-initialization request is transmitted predetermined number of times at ST511, the center side monitors whether a predetermined time has passed since the completion of the transmission (ST512).

When ClearEOC for responding to a re-initialization request is received predetermined number of times at ST530, the remote side monitors whether a predetermined time has passed since the completion of the reception (ST531). Monitoring whether a predetermined time has passed is performed in order to have a synchronization between the center and remote sides for performing a re-initialization process.

When a predetermined time has passed at ST512 and ST531, both center and remote sides start a re-initialization process (ST513 and ST532).

As described above, according to the ADSL modem of the present embodiment, the need for a re-initialization process is determined by monitoring status such as eye pattern status detected from reception data form the opposing ADSL modem. When it is determined that a re-initialization process is necessary, the center side or the remote side transmits ClearEOC having a predetermined data and requests for a re-initialization process. When the other side responds to the re-initialization request by using ClearEOC having a predetermined data, both sides recognize the need of the re-initialization process. Accordingly, the re-initialization process is performed and restarts a data communication after setting an optimal parameter for the line condition. Therefore, in a data communication, a re-initialization process is performed without terminating a data communication during a re-initialization process recognition, thereby providing an effective re-initialization process.

This embodiment illustrates a situation where the remote side first transmits ClearEOC for requesting a re-initialization, and the center side returns ClearEOC for responding to a re-initialization request in response, when a re-initialization process is necessary. However, this invention is not limited to the above embodiment and can provide an opposite setting where the center side first transmits ClearEOC for requesting a re-initialization, and the remote side returns ClearEOC for responding to a re-initialization request in response. Even with this opposite setting, it is possible to have the same effect as the present embodiment.

In addition, the present embodiment illustrates a situation where the center side or the remote side transmits ClearEOC for requesting a re-initialization in order to request a re-initialization process, while the other side returns ClearEOC to respond to the re-initialization request in response, so that both sides recognize the need for the re-initialization process. However, when one side receives a request for a re-initialization process, the re-initialization process can be performed without necessarily sending a response to the request. Nevertheless, it is preferred to respond to the re-initialization request in order to achieve a highly reliable re-initialization control.

In the above explanation, this invention is applied to an ADSL communication apparatus. However, this invention can be applied to other xDSL apparatuses provided with a communication method that performs an initialization sequence after performing a handshake procedure.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiment, and various variations and modifications may be possible without departing from the scope of the present invention.

This application is based on the Japanese Patent Application No. 2001-305569 filed on Oct. 1, 2001, entire content of which is expressly incorporated by reference herein.

What is claimed is:

1. A re-initialization method for an ADSL modem apparatus, comprising:

monitoring communication status during a data communication;

determining whether a current communication status needs a re-initialization;

requesting a re-initialization of an opposing ADSL modem apparatus by transmitting ClearEOC, when a re-initialization is necessary;

performing a re-initialization after a predetermined time period upon receiving a response to a re-initialization request from the opposing ADSL modem apparatus; and transmitting a mode select signal, the mode select signal including an identification field, a standard information field, and a non-standard information field.

2. The re-initialization method according to claim 1, the non-standard information field of the mode select signal being configured to inform the opposing ADSL modem apparatus that re-initialization can be performed.

3. A re-initialization method for an ADSL modem apparatus, comprising:

monitoring communication status during a data communication;

determining whether a current communication status needs a re-initialization;

requesting a re-initialization of an opposing ADSL modem apparatus by transmitting ClearEOC, when a re-initialization is necessary;

performing a re-initialization after a predetermined time period upon receiving a response to a re-initialization request from the opposing ADSL modem apparatus, wherein it is determined whether the re-initialization is necessary based on an eye pattern distribution that is detected from reception data from the opposing ADSL modem apparatus; and transmitting a mode select signal, the mode select signal including an identification field, a standard information field, and a non-standard information field.

4. The re-initialization method according to claim 3, the non-standard information field of the mode select signal being configured to inform the opposing ADSL modem apparatus that re-initialization can be performed.

5. A re-initialization method for an ADSL modem apparatus, comprising:

monitoring communication status during a data communication;

determining whether a current communication status needs a re-initialization;

requesting a re-initialization of an opposing ADSL modem apparatus by transmitting ClearEOC, when a re-initialization is necessary;

performing a re-initialization after a predetermined time period upon receiving a response to a re-initialization request from the opposing ADSL modem apparatus, wherein it is determined that a re-initialization request is being made or that a response to the re-initialization request is being made, when a predetermined data row is set in a predetermined bit, among bits that configure ClearEOC transmitted by the opposing ADSL modem apparatus; and transmitting a mode select signal, the mode select signal including an identification field, a standard information field, and a non-standard information field.

6. The re-initialization method according to claim 5, the non-standard information field of the mode select signal being configured to inform the opposing ADSL modem apparatus that re-initialization can be performed.

* * * * *